US010953567B2

(12) United States Patent
Kaisergruber et al.

(10) Patent No.: US 10,953,567 B2
(45) Date of Patent: Mar. 23, 2021

(54) POROUS CARRIER SYSTEM FOR REDUCING THE EMISSION OF FORMALDEHYDE IN A WOOD-BASED MATERIAL

(71) Applicant: Fritz EGGER GmbH & Co. OG, St. Johann i.T. (AT)

(72) Inventors: Theresa Kaisergruber, Wilhelmsburg (AT); Roland Mitter, Großrust (AT)

(73) Assignee: Fritz EGGER GmbH & Co. OG, St. Johann i.T. (AT)

( * ) Notice: Subject to any disclaimer, the term of this patent is extended or adjusted under 35 U.S.C. 154(b) by 0 days.

(21) Appl. No.: 16/754,862

(22) PCT Filed: Oct. 4, 2018

(86) PCT No.: PCT/EP2018/077064
§ 371 (c)(1),
(2) Date: Apr. 9, 2020

(87) PCT Pub. No.: WO2019/072689
PCT Pub. Date: Apr. 18, 2019

(65) Prior Publication Data
US 2020/0316812 A1    Oct. 8, 2020

(30) Foreign Application Priority Data

Oct. 10, 2017   (DE) ................... 10 2017 010 363.1

(51) Int. Cl.
| | | |
|---|---|---|
| *B27N 1/00* | (2006.01) | |
| *B01J 20/04* | (2006.01) | |
| *B01J 20/14* | (2006.01) | |
| *B01J 20/22* | (2006.01) | |
| *B01J 20/28* | (2006.01) | |
| *B27N 1/02* | (2006.01) | |
| *B27N 3/02* | (2006.01) | |

(52) U.S. Cl.
CPC ............ *B27N 1/003* (2013.01); *B01J 20/045* (2013.01); *B01J 20/14* (2013.01); *B01J 20/22* (2013.01); *B01J 20/28054* (2013.01); *B27N 1/02* (2013.01); *B27N 3/02* (2013.01)

(58) Field of Classification Search
CPC ... B27N 1/003; B27N 1/02; B27N 3/02; B01J 20/045; B01J 20/14; B01J 20/22; B01J 20/28054
See application file for complete search history.

(56) References Cited

U.S. PATENT DOCUMENTS

| 1,939,647 | A | * | 12/1933 | Arnold | ................. | B01J 37/0207 |
|---|---|---|---|---|---|---|
| | | | | | | 502/180 |
| 4,443,354 | A | * | 4/1984 | Eian | ...................... | B01D 53/72 |
| | | | | | | 252/184 |
| 2008/0286472 | A1 | * | 11/2008 | Tutin | ...................... | A62D 3/33 |
| | | | | | | 427/350 |
| 2016/0040006 | A1 | * | 2/2016 | Harriman | ................. | C08K 5/21 |
| | | | | | | 524/542 |

FOREIGN PATENT DOCUMENTS

| CN | 104857846 A * | 8/2015 |
|---|---|---|
| DE | 1 653 167 A1 | 11/1937 |
| DE | 653167 | 11/1937 |
| DE | 203 13 424 U1 | 11/2004 |
| DE | 20313424 | 11/2004 |
| DE | 10 2007 038041 A1 | 2/2009 |
| EP | 0 341 569 A2 | 11/1989 |
| EP | 341569 | 11/1994 |
| RU | 1782752 | 12/1992 |
| RU | 2441031 | 1/2012 |
| RU | 2450029 | 5/2012 |
| RU | 2559643 | 10/2015 |
| WO | 2011/107365 | 9/2011 |

OTHER PUBLICATIONS

International Search Report for PCT/EP2018/077064 dated Dec. 12, 2018.
International Written Opinion for PCT/EP2018/077064 dated Aug. 30, 2019 and Reply to Written Opinion dated Oct. 15, 2019.
Funk, Monika, et al. Diatomaceous earth as an inorganic additive to reduce formaldehyde emissions from particleboards, Wood Material Science & Engineering, Jun. 22, 2015 pp. 1-6.
International Preliminary Report on Patentability for PCT/EP2018/077064 dated Jan. 21, 2020.
Written Opinion of the International Preliminary Examining Authority for PCT/EP2018/077064 dated Aug. 30, 2019.

* cited by examiner

*Primary Examiner* — Sheng H Davis
*Assistant Examiner* — Michael Forrest
(74) *Attorney, Agent, or Firm* — Honigman LLP; Andrew N. Weber; Jonathan P. O'Brien

(57) ABSTRACT

The invention relates to a porous carrier system for reducing the emission of formaldehyde in a wood-based material, which comprises a formaldehyde-binding substance A and a hydroxide-releasing substance B. The invention further relates to a method for producing the porous carrier system, the use of the porous carrier system to reduce the emission of formaldehyde in a wood-based material, a wood-based material comprising the porous carrier system, and a method for producing said wood-based material.

11 Claims, No Drawings

POROUS CARRIER SYSTEM FOR REDUCING THE EMISSION OF FORMALDEHYDE IN A WOOD-BASED MATERIAL

CROSS REFERENCE TO RELATED APPLICATIONS

This application is the national phase entry of PCT Application No. PCT/EP2018/077064 filed on Oct. 4, 2018, which claims priority to Foreign Application No. DE10 2017 010 363.1 filed on Oct. 10, 2017. The entire contents of these applications are incorporated hereby by reference.

The present invention relates to a porous carrier system for reducing the emission of formaldehyde in a wood-based material, a method for producing the porous carrier system, use of the porous carrier system for reducing the emission of formaldehyde in a wood-based material, a wood-based material comprising the porous carrier system, and a method for producing the same.

Chip- or fibre-based materials, so-called wood-based materials, consist of shredded wood-based material that can be pressed into single or multilayer boards. The classification of wood chipboards is usually according to EN 309. Important classification characteristics are the production process (extruded or flat pressed), surface texture (raw, ground, press-coated), the shape and size of the wood-based materials used (wood shavings, wood flakes, wood wafers, wood strands), the board structure (single or multi-layered) and the intended use. The classification of wood fibre materials is usually according to EN 316. Important classification characteristics are the production process (wet or dry process), bulk density (hard (HB), medium hard (MB), porous (SB)), application conditions (dry, damp or outdoor) or usage.

Since in wood-based materials the massive wood composite is largely eliminated, these boards have almost the same swelling and shrinkage properties in the direction of the board plane, i.e. in the direction of the length and width of the board. Wood-based materials are used, for example, in the building industry as an insulating, constructive or cladding element, in the furniture industry and as a floor covering. In the production of wood-based materials, in particular in the production of wood chip materials, a high level of recycling of the wood can be ensured. Thus, in addition to forest wood, residual wood from industry and used wood are used.

Wood-based materials are produced from fine particles of wooden material from various types of wood with the addition of natural and/or synthetic binders and other substances. To prepare the wood-based material, cutting or grinding processes are used to recover wood particles. Examples of wood particles are wood flakes, wood strands, wood wafers, wood chips and wood fibres. Next, the wood particles are usually dried, sized with a composition (sizing liquor) containing a binder, and arranged in one or a number of different layers (spreading). Finally, the spread wood-based material is pressed under pressure and temperature to produce the particular desired wood-based material.

Binders for the production of wood-based materials may have one or more constituents. Usually binders for the production of wood-based materials consist of or contain synthetic resins.

Synthetic resins are in principle known to the person skilled in the art. Synthetic resins are, for example, described in Rompps Chemie-Lexikon, $7^{th}$ edition, Frankh'sche Verlagshandlung Stuttgart, 1973, page 1893. An important group of synthetic resins are condensate resins. These harden by condensation reactions in which water is often released. Condensate resins include, for example, phenol-formaldehyde resins and aminoplast resins.

Aminoplast resins have proved to be particularly practical in connection with the production of wood-based materials. Typically, a wood-based material contains at least one aminoplast resin as a binder. Aminoplast resins are normally used in wood-based materials to bind the lignocellulose-containing components or wood particles together. In this case, a single aminoplast resin or a mixture of different amino resins can be used.

Aminoplast resins are known to the person skilled in the art and are for example described in "Ullmanns Enzyklopädie der technischen Chemie", $4^{th}$ Edition, Volume 7, page 403 et seq. Aminoplast resins can be obtained by condensation of an amino-, imino- or amide group-containing component with a carbonyl compound. Starting materials for aminoplast resins are, for example, urea and/or melamine (as the amino-containing component) and formaldehyde (as the carbonyl compound). In the latter case, the amino groups-containing component is usually pre-condensed in a first step with the carbonyl compound to a certain degree. Depending on whether in the first step, for example only melamine or only urea is used as the amino-containing component, what is referred to as a melamine resin or a urea resin is obtained. Such melamine and/or urea resins may in particular form the main constituents of aminoplast resins. In a second step, often referred to as curing, the aminoplast resin can then be fully crosslinked. Resins which are predominantly formed from urea and formaldehyde, are also referred to as urea-formaldehyde resins (UF resins). Resins formed predominantly from melamine and formaldehyde are referred to as melamine-formaldehyde resins (MF resins). Mixed condensates of urea, melamine and formaldehyde are commonly referred to as melamine-urea-formaldehyde resins (MUF resins).

When aminoplast resins are mentioned here or elsewhere, this also means aminoplast resin compositions. Aminoplast resins and/or aminoplast resin compositions may also contain water. As a rule, amino resins and/or aminoplast resin compositions contain water.

The curing of synthetic resins, in particular of aminoplast resins, can be carried out, for example, by addition of acidic catalysts. In this case conventional curing agents are usually considered. Examples of conventional curing agents are strong organic acids, inorganic acids such as sulphuric acid and phosphoric acid, salts which are acidic in water, such as aluminium chloride and aluminium nitrate (also referred to as acid salts), salts which generate an acid by reaction with components of the synthetic resin, preferably with formaldehyde (also referred to as acid-generating salts) such as ammonium phosphate, ammonium nitrate, ammonium sulphate and ammonium chloride, and mixtures of the above-mentioned substances.

A disadvantage of the acids used as curing agents is that they make a major contribution to the undesired hydrolysis of the glued joint, which not only leads to an emission of formaldehyde into the environment, but can also have a negative effect on the strength and the swelling properties of the wood-based material. The same applies to the use of acid salts. Often, additional buffer systems need to be used to reduce these disadvantages, although these can in turn lead to insufficient curing of the resin and an associated lower strength and increased tendency to swelling.

Another disadvantage of the acid-generating salts is that these salts usually require free formaldehyde to form the corresponding strong acid, which then contributes to the curing of the resin. In this respect binder compositions (sizing liquors) containing curing agent systems based on acid-generating salts, require an increased formaldehyde content. This formaldehyde is usually not permanently bonded and once the production process is complete it may be slow to be released.

Formaldehyde may be harmful to human or animal health and may cause allergies, skin, respiratory or eye irritation. With severe and chronic exposure, it may even be carcinogenic. Therefore, it is desirable to minimise the emission of formaldehyde in a wood-based material. This is particularly important with regard to the use of wood-based materials for the production of furniture or flooring.

In order to reduce the emission of formaldehyde in wood-based materials, different methods have already been proposed in the prior art. For example, it is known to lower the molar ratio of formaldehyde to the amino group-containing component, such as urea or melamine, in binder compositions. But this only allows a certain reduction of the emission of formaldehyde to be achieved, since at the same time the strength properties and the swelling behaviour of the wood-based materials so obtained deteriorate.

It has previously also been proposed to add further substances that are able to bind formaldehyde to the binder composition or to the wood particles sized with the binder composition during the wood-based material production. Such substances, also called "formaldehyde scavengers", are substances having free amino groups, such as melamine or urea. By adding such substances to the binder composition or to the wood chips sized with the binder composition, a part of the formaldehyde reacts directly with these substances, further reducing the molar ratio of formaldehyde to the amino group-containing component, e.g. melamine or urea, already contained in the binder composition. But this also leads to a reduction in the reactivity of the binder composition, i.e. slower curing and, consequently, increased pressing times in the production of wood-based materials. Furthermore, the wood-based materials thus produced have significantly poorer strength and swelling properties.

DE 1 653 167 A1 describes a method for the production of chipboard, wherein after sizing fine-particle substances are mixed in with the wood chips which chemically bind formaldehyde. These fine-particle substances are wood chips or wood dust impregnated with an aqueous solution of urea, melamine or phenols.

EP 0 341 569 A2 describes a process for the production of composite materials with reduced emission of formaldehyde through use of a formaldehyde scavenger. The formaldehyde scavenger is in powdered or prilled form and is in each case provided with a water resistant and/or water-impermeable coating. The result of the coating is that the formaldehyde scavenger particles do not dissolve until the final stage of the curing process, without the molar ratio of formaldehyde to amino group-containing component of the resin, such as melamine or urea, being adversely affected during the hardening process of the glued joint.

Funk, M. et al., Wood-based material Science & Engineering, 2015, pages 1-6 describe the use of a urea-loaded porous carrier material to reduce the emission of formaldehyde. The results of the transverse tensile strength measurements described in Funk et al. do not show that the addition of the urea-loaded porous carrier material compared with the addition of pure urea has a favourable influence on the transverse tensile strength.

A disadvantage of the aforementioned method is that the cured glued joint is acidic due to the curing agent used for curing of the aminoplast resin and thus not resistant to hydrolysis, so that both a further emission source of formaldehyde and a deterioration of the strength and swelling properties of the composite material compared to a composite material with neutral glued joint can be expected.

On the basis of the above-described prior art and its disadvantages, it was an object of the invention to provide an improved porous carrier system for reducing the emission of formaldehyde in wood-based materials. In particular, it was an object of the invention to provide a porous carrier system for reducing the emission of formaldehyde, which allows the production of wood-based materials with a further reduced formaldehyde content which at the same time, as compared to the systems known from the prior art, allows maintained or improved strength and swelling properties without detriment to the processing speed, e.g. the pressing time.

This object is achieved by a porous carrier system, a process for its production, the use of the porous carrier system, a wood-based material comprising the porous carrier system, and a method for producing the wood-based material comprising the porous carrier system according to the present invention as set forth in the claims.

Advantageous embodiments of the invention are described in the dependent claims and are explained below in detail as is the general concept according to the invention.

The porous carrier system according to the invention for reducing the emission of formaldehyde in a wood-based material includes a formaldehyde-binding substance A and a hydroxide-releasing substance B.

Surprisingly, it has been found in practical experiments that a porous carrier system which comprises a combination of a formaldehyde-binding substance A and a hydroxide-releasing substance B avoids or reduces as far as possible the problems listed above which are known from the prior art. This was particularly surprising because the person skilled in the art would expect that in each case both the addition of a formaldehyde-binding substance A and the addition of a hydroxide-releasing substance B would lead the curing rate and the curing level of the binder composition in the production of a wood-based material being impaired, thereby affecting its strength and swelling properties.

With the porous carrier system according to the invention, in comparison with the systems known from the prior art, the emission of formaldehyde can be reduced without significantly impairing the strength and swelling properties of a wood-based material. Rather, with the porous carrier system according to the invention, an improvement in these properties can sometimes actually occur. Without wishing to be bound by scientific theories, this surprising effect appears to be based on the fact that the formaldehyde-binding substance A and the hydroxide-releasing substance B are initially inactively adsorbed onto the porous carrier system and react only when released from the porous carrier system. The release is apparently delayed, so that the substances A and B do not negatively affect the curing rate and the curing level of the binder composition in the production of the wood-based material and only develop their effect later in the final product. Due to the delayed release of the hydroxide-releasing substance B, it is only after curing of the binder composition that neutralisation of the acidic curing agent occurs and thus neutralisation of the glued joint. This advantageously leads to the glued joint being less susceptible to hydrolysis and thus an additional source of the emission of formaldehyde is avoided without affecting the curing process during production. Furthermore, the delayed release of the formaldehyde-binding substance A ensures that following curing unbound formaldehyde is scavenged, so that the emission of formaldehyde in the wood-based material is further reduced. Surprisingly, the interaction of the substances A and B of the porous carrier system in combination leads in part to an enhancement of the respective effects of the individual substances.

Where a "comparison to the systems or materials known from the prior art" is mentioned here or at another point, this is a comparison to the porous carrier materials known from the prior art, in particular the one described above, for reducing the emission of formaldehyde in a wood-based material, and to the purely formaldehyde-binding or hydroxide-releasing substances and their application in a wood-based material known from the prior art.

A "porous carrier system" within the meaning of the invention is a system comprising at least one porous carrier material. A "porous carrier material" as used herein is a carrier material which has pores and is permeable to liquid and air. "Pores" are voids in the overall volume of the carrier material.

According to one embodiment of the invention, substance A and substance B are contained in at least one porous carrier material A. The degree of loading with the two substances A and B can vary between 1 and 75 wt.-% based on the total mass of the dry loaded porous carrier material A. Preferably, the degree of loading with substance A is 1 to 70 wt.-%, preferably 15 to 50 wt.-%, in particular 20 to 45 wt.-%, based on the total mass of the dry loaded porous carrier material A, and the degree of loading with the substance B is 1 to 70 wt.-%, preferably 1 to 50 wt.-%, preferably 5 to 45 wt.-%, in particular 5 to 25 wt.-%, particularly preferably 10 to 20 wt.-% based on the total mass of the dry loaded porous carrier material A. It has been found that a loading of 20 to 45 wt.-% with substance A and of 10 to 20 wt.-% with substance B based on the total mass of the dry loaded porous carrier material A provides the optimum balance between improved reduction of the emission of formaldehyde and the lowest possible production costs.

Where it is mentioned here or elsewhere that the substance A and/or B "is contained in at least one porous carrier material", this means that the substance can be located both within the pores of the carrier material and on the surface of the carrier material.

Where "dry loaded porous carrier material" is mentioned here or elsewhere, this means a loaded porous carrier material which has been dried to constant mass by freeze-drying.

Methods for determining the degree of loading of the porous carrier material with the substance A and/or B are generally known to the person skilled in the art. The degree of loading of the carrier material with substance A and/or B is preferably determined as follows: an amount of the examined dry loaded porous carrier material of about 3 to 5 g accurately weighed to within 0.001 g is washed on a filter paper at least 5 times with hot water and then pre-incinerated in a porcelain crucible on a Bunsen burner. Then, the porcelain crucible is annealed in a crucible furnace at approximately 600° C. for approximately 1 to 2 hours. The cooled sample is then accurately re-weighed to within 0.001 g.

Also, the ratios of the two substances A and B to the porous carrier material can vary. Thus, the porous carrier material A may contain the substance A and the substance B in a ratio of 10:1 to 1:10. Preferably, the carrier material is loaded with a ratio of substance A to substance B of 5:1 to 1:1, more preferably from 3:1 to 1.5:1.

If "substance A" or "substance B" is mentioned here or elsewhere, this also means a mixture of substances, i.e. the formaldehyde-binding substance A or the hydroxide-releasing substance B may comprise a mixture of two or more formaldehyde-binding substances A or hydroxide-releasing substances B. The formaldehyde-binding substance A and the hydroxide-binding substance B can also be one and the same substance if it can both bind formaldehyde and release hydroxide.

According to an alternative embodiment of the invention, substance A is contained in at least one porous carrier material A and substance B in at least one porous carrier material B. Such a porous carrier system has the advantage that the ratios of the substances A and B are not predetermined by the loading and can therefore be flexibly adjusted by the user by mixing the loaded carrier materials A and B in the appropriate ratio. The carrier materials A and B are preferably mixed to produce a porous carrier system according to the invention in a mixing ratio of 10:1 to 1:10.

The degree of loading of the substance A on the carrier material A and the substance B on the carrier material B can in each case independently vary between 1 and 70 wt.-%, based on the total mass of the porous carrier material A or B. Preferably, the level of loading of the substance A on the carrier material A is 15 to 50 wt.-%, in particular 20 to 45 wt.-%, based on the total mass of the porous carrier material A. Preferably, the degree of loading with the substance B on the carrier material B is 1 to 50 wt.-%, preferably 5 to 45 wt.-%, in particular 5 to 25 wt.-%, particularly preferably 10 to 20 wt.-%, based on the total mass of the porous carrier material B.

Suitable porous carrier materials are known in principle to the person skilled in the art. Preference is given to using porous materials, such as porous minerals, porous ceramics, wood chips, wood dust or modified activated carbon.

The porous carrier materials used for the substance A or B may be the same or different. According to a preferred embodiment of the invention, the same porous carrier material is used as the porous carrier material A and as the porous carrier material B.

The porous carrier material A and/or B may also consist of a mixture of two or more porous carrier materials.

According to a preferred embodiment of the invention, the porous carrier material A and/or B is selected from the group consisting of diatomaceous earth, modified or unmodified silicic acid, bentonites and related substances, phyllosilicates, clay, zeolites, modified activated carbon and expanded graphite. In practical experiments diatomaceous earth has proven to be a particularly suitable carrier material. This is particularly the case, since the pore volume of diatomaceous earth is approximately 40% and the pore distribution, which is between 0.1 and 0.001 mm, on the one hand allows a simple loading with the formaldehyde-binding substance A and the hydroxide-releasing substance B, while on the other there is still enough free pore volume available to ensure an intensive gas exchange of water and formaldehyde to provide a sufficient formaldehyde-binding effect.

The formaldehyde-binding substance A comprised by the carrier system according to the invention is a substance which is capable of chemically binding formaldehyde. This is preferably done by chemical reaction of the formaldehyde with the substance A.

A "chemical reaction" involves the splitting and/or formation of covalent bonds of the components involved in the reaction. This must be understood in contrast to a "physical reaction" which is based exclusively on interactions between the components and does not lead to a splitting and/or a new formation of covalent bonds of the components involved in the reaction.

Suitable formaldehyde-binding substances A are, for example, diazines, triazines, melamine, urethanes, polyamines, polyacrylic acid amides, urea, guanidine, hydroxylamine, ethylenediamine, aniline, phenols, resorcinol, dibutylthiourea, diphenylmethane diisocyanate, dicyandiamide, thiourea, sulphites, ammonium carbonate, carbamates with free amide functions and mixtures thereof.

Preferably, the formaldehyde-binding substance A is selected from the group consisting of urea, ammonium carbonate, carbamates with free amide functions, sulphites and mixtures thereof. The use of urea as formaldehyde-binding substance A has proved to be particularly practical. Urea is a cheap, easy-to-handle formaldehyde-binding substance that due to the good solubility in water allows high loadings of the porous carrier material. Urea crystallises in the porous carrier material in the form of needles. This results in enough free pore volume for a sufficiently good gas exchange remaining in the porous carrier material after loading.

The porous carrier system according to the invention further comprises a hydroxide releasing substance B. A "hydroxide-releasing substance" is a substance capable of releasing a hydroxide, i.e., OH-ions, by a chemical reaction. The hydroxide-releasing substance B can release hydroxide, for example, by reaction with water or by reaction with formaldehyde and water. Preferably, the hydroxide-releasing substance B releases hydroxide by reaction with formaldehyde and water. Suitable hydroxide-releasing substances B are for example, the salts of *sulphurous* acid (sulphites), carbonates or hydroxides.

Preferably, the hydroxide-releasing substance B is selected from the group consisting of sodium sulphite, sodium carbonate, ammonium carbonate, potassium carbonate and sodium hydroxide. Particularly preferred is the use of sodium sulphite as hydroxide releasing substance B. This has the advantage that sodium sulphite by reaction with formaldehyde and water can both release hydroxide and bind formaldehyde.

The invention further relates to a process for producing a porous carrier system for reducing the emission of formaldehyde in a wood-based material, comprising the following steps:

a1) applying a liquid composition comprising a substance A and a substance B to a porous carrier material A, and b1) at least partially removing the liquid composition from the porous carrier material, or a2) applying a first liquid composition comprising the substance A to at least one porous carrier material A, b2) at least partially removing the first liquid composition from the at least one porous carrier material A, c2) applying a second liquid composition which comprises the substance B to the at least one porous carrier material A, and d2) at least partially removing the second liquid composition from the at least one porous carrier material A.

Such a method is used for producing a porous carrier material in which substance A and substance B are contained in the same at least one porous carrier material A.

Another object of the invention is a method for the production of a porous carrier system for reducing the emission of formaldehyde in a wood-based material comprising the following steps:

a3) applying a liquid composition comprising a substance A to at least one porous carrier material A, b3) applying a liquid composition comprising the substance B to at least one porous carrier material B, c3) at least partially removing the liquid compositions from the porous carrier materials A and B, and d3) mixing of the porous carrier materials A and B obtained.

This method is used to produce a porous carrier material in which the substances A and B are contained in different porous carrier materials, substance A in at least one porous carrier material A and substance B in at least one porous carrier material B.

In this case, for the features of the two methods, that stated above concerning the features of the porous carrier system according to the invention or its embodiments and that stated in the following on the features of the method for producing the porous carrier system apply correspondingly.

The term "liquid composition" herein means a composition which is completely or partially liquid. A "liquid composition" may also be a suspension, emulsion or melt. According to one embodiment of the invention, the liquid composition is a composition in which the substance A and/or B is/are dissolved. Preferably, the liquid composition is a solution.

Where "applying a liquid composition to a porous carrier material" is mentioned here, this means bringing the porous carrier material into complete or partial contact with this liquid composition. In principle, various methods are known to the person skilled in the art for applying liquid compositions to carrier materials. According to one embodiment of the invention, the application of the liquid composition is selected from immersing the porous carrier material in the liquid composition, flooding of the porous carrier material with the liquid composition or spraying of the liquid composition onto the porous carrier material. "Flooding" of the porous carrier material is understood to mean the covering of the porous carrier material with the liquid composition.

It has proved to be particularly practical if the application of the liquid composition is by immersing the porous carrier material in the liquid composition or flooding the porous carrier material with the liquid composition. Application of a vacuum has also proven advantageous for applying the liquid composition. According to a preferred embodiment of the invention, the application of the liquid composition comprises applying a vacuum. As a result, air contained in the porous carrier material can be displaced in a short time by the liquid composition in which the porous carrier material is immersed or with which the porous carrier material is flooded, and thus a rapid, complete wetting of the porous carrier material with the liquid composition can be ensured, i.e. the wetting time for a complete wetting is less than 1 hour, in particular less than 40 min, preferably between 20 and 40 min, without the carrier material having to remain in the liquid composition for a long time. Alternatively, as complete as possible wetting can also be achieved in that the application of the liquid composition comprises further resting of the immersed porous material carrier material in the liquid composition. In this case, dwell times of between at least 3 hours and 24 hours are appropriate. Preferably, the resting of the immersed porous carrier material in the liquid composition takes place with a dwell time of between at least 3 hours and 5 hours. Practical experiments have shown that the loading of the porous support changes only marginally after this dwell time. According to a further embodiment of the invention, applying the liquid composition to the porous carrier material also comprises stirring the porous carrier material in the liquid composition or the liquid composition.

Here, "at least partially removing" the liquid composition means a complete or partial removal of the contact between liquid composition and porous carrier material. In this case, of course, components of the liquid composition remain adsorbed on the porous carrier material. For example, at least partial removal of the liquid composition can be achieved by filtration, centrifugation, drying or spray-drying. According to one embodiment of the invention, the at least partial removal of the liquid composition is achieved by filtration.

With filtration the loaded porous carrier material obtained is still wet. Practical experiments have shown that it can already be used advantageously in such a moist state to reduce the emission of formaldehyde in a wood-based material.

Alternatively, the loaded porous carrier material can be dried after filtration. According to a further embodiment of the invention, after the at least partial removal of the liquid composition in one of the steps b1) and c3) and also b2) and/or d2), the methods according to the invention further comprise the drying of the porous carrier material. The drying of the moist, loaded porous carrier material advantageously takes place at temperatures of between 20 and 80° C., in particular 20 to 40° C., preferably at 30° C. The humidity is preferably between 2 and 10%, in particular 5%. The drying of the moist carrier material is preferably carried out as far as a residual moisture content of less than 15%, preferably less than 5%, particularly preferably less than 3%. The determination of the residual moisture is carried out by freeze drying until constant weight. Experience has shown that the constant weight is reached after a period of freeze-drying of 2 days. To improve the flowability of the porous carrier material, a flow agent can be added to this. Common flow agents are known to the person skilled in the art and can consist, for example, of the dry, uncharged, porous carrier material. Preferred flow agents are pyrogenic silica or diatomaceous earth, particularly preferably diatomaceous earth is used.

It is also conceivable that the steps of applying and partially removing the liquid composition mentioned in the method according to the invention are repeated several times in succession. In this way, advantageously, a higher degree of loading of the porous carrier material with the substance A and/or B can be achieved. In this case, the step of drying can also be carried out after each partial removal of the solution or only after completion of the repetitions of the steps of applying and removing the liquid composition.

The invention further relates to the use of a porous carrier system according to the invention for reducing the emission of formaldehyde in a wood-based material. In this case, for the features of the use that stated above regarding the features of the porous carrier system according to the invention or its embodiments apply correspondingly. In particular, according to a preferred embodiment of the use according to the invention, the formaldehyde-binding substance A and the hydroxide-releasing substance B are contained in at least one porous carrier material A. In an alternative embodiment of the use according to the invention the formaldehyde-binding substance A is contained in at least one porous carrier material A and the hydroxide-releasing substance B is contained in at least one porous carrier material B.

The above-mentioned advantages of the porous carrier system according to the invention also apply to the use according to the invention of the porous carrier system in a wood-based material. In particular, by the use of the porous carrier system, the emission of formaldehyde in the wood-based material can be reduced without negatively affecting the strength and swelling properties of the wood-based material compared with the systems known from the prior art. Compared with the use of systems for reducing the emission of formaldehyde in a wood-based material known from the prior art, the strength of the wood-based material can actually be improved while reducing the emission of formaldehyde. Also, by using the porous carrier system, compared to the use of the known systems for reducing the emission of formaldehyde, an improvement of the swelling behaviour and/or the water absorption can be achieved. One reason for this could be that discharge of the formaldehyde-binding substance A and the hydroxide-releasing substance B from the porous carrier is delayed and so do not adversely affect the curing speed and the curing level of the binder composition in the production of the wood-based material. As a result of the hydroxide-releasing substance B, only the finished glued joint is neutralised by delayed release of hydroxide, which prevents hydrolysis of the glued joint and thus inhibits further emission of formaldehyde and loss of strength and increased swelling and/or water absorption of the glued joint of the wood-based material associated with the hydrolysis.

The invention further relates to a wood-based material comprising a porous carrier system according to the invention or its embodiments for reducing the emission of formaldehyde described above. For the features of the wood-based material according to the invention, that stated above concerning the characteristics of the wood-based material carrier system or its embodiments and that stated below concerning the features of the method for producing the wood-based material or its embodiments, apply correspondingly. Such a wooden material can be used particularly well for the production of a laminate, flooring, a countertop, tabletop, a piece of furniture or a part of a building wall or ceiling.

An object of the invention is also a method for the production of the wood-based material according to the invention or its embodiments described above, comprising the following steps:

a) providing a lignocellulose-containing material in the form of wood particles, b) sizing the lignocellulose-containing material with a composition comprising at least one aminoplast resin, and c) pressing into a wood-based material, wherein before, during and/or after at least one of the steps a) or b) a porous carrier system according to the invention is added. The steps a) to c) are preferably carried out in alphabetical order one after the other. However, steps a) and b) in particular can also be combined. The emission of formaldehyde, swelling, transverse tensile strength and water absorption are important parameters for wood-based materials. Surprisingly, it has been found in practical experiments that these parameters are improved in wood-based materials produced by the method according to the invention. In particular, when using the porous carrier system according to the invention, a formaldehyde-binding substance A and a hydroxide-releasing substance B can be added during the production process, without resulting in a deterioration of these parameters. For example, the transverse tensile strength of the wood-based materials produced, in comparison to those in which the pure substances A and/or B, i.e. the substances without carrier material, or those in which the substance A is added to a carrier material during the production process, can be improved. Furthermore, the swelling and/or the water absorption of the wood-based materials produced, compared to those in which the pure substances A and/or B or the substance A are added to a carrier material during the production process, can be significantly reduced.

Where "lignocellulose-containing material" is referred to here, this means plant material containing lignocellulose. Lignocellulose according to the invention contains cellulose and/or hemicellulose and lignin.

"Cellulose" is an unbranched polysaccharide consisting of several hundred to ten thousand cellobiose units. The cellobiose units in turn consist of two molecules of glucose linked by a β-1,4-glycosidic bond.

"Hemicellulose" is a collective name for various components of plant cell walls. Hemicelluloses are branched smaller chain length polysaccharides—usually less than 500 sugar units—made up of different sugar monomers. Hemicellulose is essentially made up of different sugar monomers, such as, for example, glucose, xylose, arabinose, galactose and mannose, wherein the sugars may have acetyl and methyl-substituted groups. They have a random, amorphous structure and are readily hydrolysable. Xylose and arabinose consist for the most part of sugar monomers with five carbon atoms (pentoses). Mannose or galactose consist mainly of sugar monomers with six carbon atoms (hexoses).

"Lignins" are amorphous, irregularly branched aromatic macromolecules, which occur naturally as part of cell walls and cause lignification of the cell there. They have a substituted phenylpropanol units-based structure, exhibit a lipophilic character and are insoluble at room temperature in neutral solvents, such as water. Precursors of lignin are, for example, p-coumaryl alcohol, coniferyl alcohol and sinapyl alcohol. The molecular weights of lignin are usually between 10,000 and 20,000 g/mol.

"Hydrolysis" within the meaning of the invention may, in particular, denote the cleavage of a (bio)chemical compound by reaction with water. In particular, it is possible in this case to formally deliver a hydrogen atom to the one cleavage product and the remaining hydroxyl group to the other cleavage product.

Whenever "wood-based material" is mentioned here, then according to the invention it is understood to mean a wide variety of chip- or fibre-based materials, comprising or containing wood. Wood chip materials (chipboards in the broadest sense) designates a product group in the field of wood-based materials, produced from wood particles and at least one binder by means of heat and pressure. Another group of products in the field of wood-based material, not covered by the term "wood chip materials" as used herein, are wood fibre materials. These included fibreboards such as medium-density (MDF) and high-density (HDF) fibreboard. In contrast to wood chip materials, the wood used for the production of the fibreboard is macerated into wood fibre, fibre bundles or fibre fragments. For the person skilled in the art, wood chip materials and wood fibre materials are two fundamentally different material categories between which it is necessary to distinguish.

Basically, the person skilled in the art is able to identify different wood-based materials. Examples include particleboard, medium density fibreboard (MDF) and high density fibreboard (HDF), low density fibreboard (LDF), flat-board, single-layer board, multi-layer board, lightweight flat-board, Extruded Tubular (ET), Extruded Solid (ES), Melanin Faced Board (MFB), Chipboard Moulded or Oriented Strand Board (OSB). A classification of chipboard can be made according to DIN EN 312, whereby the chipboard can differ in strength and moisture resistance. OSB boards can be classified according to their use in accordance with EN 300.

Such wood-based materials can be further processed, for example into laminates, floor coverings, countertops, tabletops, parts of a building wall or ceiling and/or wood mouldings.

According to a preferred embodiment of the invention, the wood-based material is a wood chip material.

According to one embodiment of the invention, the wood-based material is a wood panel. Preferably, the wood-based material is a chipboard or OSB board. Practical experiments have shown that the method according to the invention and the described embodiments are particularly suitable for the production of pressed wood-based materials, in particular for the production of chipboards and OSB boards.

Preferably, the wood-based material, or its primary or intermediate product, comprises substantially lignocellulose-containing material and binders. "Substantially" means in this case up to 90 wt.-%, 95 wt.-%, 99 wt.-% or 99.9 wt.-%, in each case based on the total weight of the wood-based material. However, it is also possible that the wood-based material, or its primary or intermediate product, contains other substances. For example, wetting and/or separating agents can be added for an improved pressing process. Furthermore, antifungal agents or fire retardants may be added. As a result, the finished lignocellulose wood-based materials can meet specific requirements. Such requirements have already been mentioned above and are known to the person skilled in the art. The wood-based material may contain, for example, light particles, in particular expanded styrene particles, for weight reduction and/or glass or carbon fibres for increasing the strength. In particular, such further substances may be added in the method according to the invention before, during and/or after at least one of the steps a) or b).

Step a) of the method according to the invention provides for the provision of wood particles. When wood particles are mentioned here, this means any wood particles that can be used for the production of wood-based materials. Wood particles can be any be any products from the comminution of lignocellulose-containing materials.

For the production of wood-based materials by the method according to the invention, a lignocellulose-containing material is used in step a), which is present in the form of wood particles. Depending on the type of wood-based material, the lignocellulose-containing material can be produced by comminuting lignocellulose-containing materials. According to the invention, the lignocellulose-containing material is provided in the form of wood particles, i.e. it can contain or consist of wood particles. Wood particles, as used here, may contain wood or be made of wood. Examples of wood particles are fine-grained wood-based material, wood chips, wood strands, wood wafers, wood flakes and wood fibres. Usually, the wood particles for wood-based materials are obtained by cutting or grinding processes. In an optional step, the wood particles can be dried or stored before the further processing. The lignocellulose-containing material can also be mixed with other substances.

The method according to the invention comprises in step b) the sizing of the lignocellulose-containing material with a composition comprising at least one aminoplast resin.

Where "sizing" is referred to here, then this may be understood to mean complete or partial wetting with a composition that contains a binder ("binder-containing composition"). Such compositions are also referred to by the person skilled in the art as a "sizing liquor". According to the invention, the binder is an aminoplast resin. Sizing can in particular also mean the uniform distribution of the binder-containing composition on the wood particles. The application of the binder-containing composition can be carried out, for example, by impregnation or spraying.

The amount of binder used in the sizing is preferably 0.1 to 20 wt.-%, in particular 1 to 16 wt.-%, more preferably 4 to 14 wt.-%, based on the dry weight of wood (solid resin/absolutely dry). For many applications, it is particularly practical if the binder is used in an amount of 0.1 to 15 wt.-% based on the dry weight of wood (solid resin/absolutely dry).

When reference is made here to "dry weight", this means the dry matter content. The dry matter content is that part of a substance that remains after subtracting the mass of the water contained in it. This means that the dry matter content plus the water content of a substance total 100 percent.

Basically, the method according to the invention or one of its embodiments is suitable for a variety of binder-wood particle combinations. According to the invention, at least one aminoplast resin is used as the binder. In addition, other synthetic resins, in particular phenolic resins, vinyl acetates, isocyanates, epoxy resins and/or acrylic resins can be used in the method according to the invention. Examples of aminoplast resins are urea-formaldehyde Resins (UF), melamine-reinforced urea-formaldehyde resins (MUF), melamine-urea-phenol-formaldehyde resins (MUPF), or mixtures thereof. According to a preferred embodiment of the method according to the invention, the at least one aminoplast resin is selected from urea-formaldehyde resins (UF), melamine-reinforced urea-formaldehyde resins (MUF) or mixtures thereof.

In a preferred embodiment of the method according to the invention, the composition comprising at least one aminoplast resin in step b) further comprises at least one curing agent. Examples of suitable curing agents are strong organic acids, inorganic acids such as sulphuric acid and phosphoric acid, salts which are acidic in water, such as aluminium chloride and aluminium nitrate, salts which generate an acid by reaction with components of the synthetic resin, preferably formaldehyde, such as ammonium phosphate, ammonium nitrate, ammonium sulphate and ammonium chloride, and mixtures of the foregoing. In the method according to the invention, ammonium nitrate or ammonium sulphate is preferably used as the curing agent. Advantageously, the binder contains 0.1 to 15 wt.-% of the curing agent, in particular 0.5 to 5 wt.-%, based on the solid resin content of the aminoplast resin.

In principle, various methods are known to the person skilled in the art in order to produce wood-based materials by pressing. According to one embodiment of the invention, the wood particles sized in step b) are pressed in step c) into a wood-based material. Preferably, step c) involves hot pressing. Optimum results can be achieved if the compression factor during hot pressing is from 2 to 10 s/mm, preferably from 3 to 6 s/mm. Here, compression factor is understood in particular to mean the dwell time of the lignocellulose-containing wood-based material in seconds per millimetre thickness or strength of the finished pressed lignocellulose-containing wood-based material in the press.

Suitable temperatures for the compression in step c) of the method according to the invention or one of its embodiments are temperatures of 150° C. to 250° C., preferably from 160° C. to 240° C., particularly preferably from 180° C. to 230° C. At temperatures in these ranges, the process can be carried out particularly economically.

For economic and process-engineering reasons, it has proved to be advantageous if a specific pressing pressure (active pressure on the board surface) of 50 to 300 N/cm², is used during pressing. Such pressures ensure a particularly good bonding of the lignocellulose-containing particles together. In addition, a high strength of the lignocellulose-containing wood-based materials can be achieved with such a pressing pressure.

In the method according to the invention, a porous carrier system according to the invention is added before, during and/or after at least one of steps a) or b). This can be done in many ways. In particular, the porous carrier system can for example be provided and the lignocellulose-containing material in the form of wood particles applied thereto. Before the lignocellulose-containing material is provided in the form of wood particles, the porous carrier system may also be mixed with this and then provided in a mixture with the wood particles in step a). Furthermore, it is possible to provide the porous carrier system at the same time as the wood particles, wherein the simultaneous provision is brought about by two separate application devices.

It is also possible for the porous carrier system to be added to the aminoplast resin before and/or during the sizing in step b). As a composition for sizing the wood particles, a previously prepared mixture of aminoplast resin and porous carrier system may also be used and, as such, then applied to the wood particles. The wood particles are therefore sized with a composition containing an aminoplast resin and a porous carrier system in that a previously prepared mixture of aminoplast resin and porous carrier system is applied to the wood particles.

The method according to the invention, however, also encompasses those embodiments in which the porous carrier system is added to the aminoplast resin only during sizing. This can be brought about in particular by applying the aminoplast resin and the porous carrier system separately from one another, optionally with further additives or binders, to the wood particles when the wood particles are sized. For example, in a first step, the aminoplast resin and in a second step the porous carrier system can be applied to the wood particles. Conversely, it is also possible in a first step to initially apply the porous carrier system and then in a second step, the aminoplast resin to the wood particles. Also, a simultaneous application of aminoplast resin and porous carrier system by two separate applicators, such as nozzles, to the wood particles is possible. Accordingly, the wood particles may be sized with a composition containing an aminoplast resin and a porous carrier system by separately applying the aminoplast resin and the porous carrier system to the wood particles.

Furthermore, the method according to the invention also includes the application of the carrier system after sizing in step b), that is to say before the pressing in step c).

Practical experiments have shown that in the method according to the invention, the amount of the porous carrier system according to the invention added before, during and/or after at least one of the steps a) or b) is preferably from 0.1 to 10 wt.-%, in particular from 1 to 8 wt.-%, preferably from 1 to 5 wt.-%, particularly preferably from 1.5 to 3 wt.-% based on the wood dry weight (solid resin/absolutely dry).

In the following, the invention will be described in more detail by way of example with reference to exemplary embodiments.

EXAMPLE 1

First, the production of a porous carrier system will be described. Here, the variants 1 and 2 serve to produce a porous carrier system in which the substance A is contained in at least one porous carrier material A and substance B in at least one porous carrier material B. Variant 3 is used to produce a porous carrier system in which the substance A and the substance B are contained in at least one porous carrier material A.

Diatomaceous earth was used as the porous carrier material A and B. The porous carrier material A was loaded with a freshly prepared 40 wt.-% solution of urea, based on the total weight of urea and water, and the porous carrier material B with a 20 wt.-% sodium sulphite solution, based on the total weight of sodium sulphite and water, as follows:

Variant 1:

500 g of diatomaceous earth were weighed out and covered with 1 litre of the freshly prepared urea or sodium sulphite solution. Then, a vacuum was applied until no further bubbles emerged due to air escaping from the pores of the diatomaceous earth, and the urea or sodium sulphite-loaded diatomaceous earth was filtered off and dried in a climatic chamber at 30° C. and 5% atmospheric humidity.

Variant 2:

500 g of diatomaceous earth were weighed out and covered with 1 litre of the freshly prepared urea or sodium sulphite solution and stored in a sealed container for 24 hours. Then, the diatomaceous earth loaded with urea or sodium sulphite was filtered off.

Variant 3:

500 g of diatomaceous earth were weighed out and covered with 1 litre of a freshly prepared solution of 200 g of urea and 100 g of sodium sulphite in 700 g of water and stored in a sealed container for 24 hours. Then the diatomaceous earth loaded with urea and sodium sulphite laden was filtered off and dried.

EXAMPLE 2

Board tests were carried out under the following conditions:
Board thickness: 14 mm
Chip material: Wood chips with an average length of 1 to 12 mm, an average width of 1 to 6 mm and an average thickness of 0.1 to 2 mm.
Sizing: The binder used was urea-formaldehyde in an amount of 8% by weight, based on the dry weight of the wood (solid resin/absolutely dry).
Curing agent: 60% ammonium nitrate, was used in an amount of 3 wt.-% based on the solid resin content of the aminoplast resin.
Target density: 600 kg/m$^3$
Pressing temperature: 220° C.
Compression factor: 9.3 s/mm Three different types of boards were produced. In each case two boards were produced per board type, i.e. the quantity stated below in the production of the respective boards is doubled again.

Reference Board

A board which was produced under the conditions indicated above without any addition of pure urea or of the porous carrier system according to the invention served as a reference.

Board According to the Prior Art

As a prior art board already provided with a material for reducing the emission of formaldehyde, (1) two boards were produced under the conditions indicated above and additionally after sizing, i.e. before pressing, 0.5 or 2 wt.-% of urea (U) based on the dry weight of wood (solid resin/absolutely dry) was added, and (2) six boards were produced under the conditions indicated above, and additionally after sizing, i.e. before pressing, 0.5, 1.5 and 3 wt.-% of urea-loaded diatomaceous earth (KGU) or sodium sulphite-loaded diatomaceous earth (KGS) in each case based on the dry weight of wood (solid resin/absolutely dry) was added.

Board According to the Invention

As a board according to the invention, three boards were produced under the conditions indicated above and, in addition, after sizing, i.e. before pressing, a mixture of:

(1) 0.4 wt.-% loaded with urea diatomaceous earth (KGU) and 0.1 wt.-% loaded with sodium sulphite diatomaceous earth (KGS) (total 0.5 wt.-% loaded diatomaceous earth) based on the dry weight of wood (solid resin/absolutely dry) was added, as well as (2) 2.7% by weight of diatomaceous earth loaded with urea (KGU) and 0.3% by weight of diatomaceous earth loaded with sodium sulphite (KGS) (in total 3% by weight of loaded diatomaceous earth), based on the dry weight of the wood (solid/absolutely dry) was added.

(3) 3 wt.-% of diatomaceous earth (KGUS) loaded with urea and sodium sulphite based on the dry weight of the wood (solid resin/absolutely dry) was added.

Following the board pressing, the transverse tensile strength, the emission of formaldehyde, swelling and water absorption of the boards were determined. For the determination of the transverse tensile strength, swelling and water absorption, first ten specimens with a geometry of 50×50×14 mm were cut for each board. To determine the emission of formaldehyde by desiccator measurement, first test specimens were cut with the dimensions 5×15×1.4 cm. The total area of the samples in the desiccator measurement must be 1800 cm$^2$, so for 14 mm boards, nine samples per board are needed. To determine the emission of formaldehyde by means of a perforator method, first ten test pieces with a geometry of 2.5×2.5×1.4 cm were cut for each board. Each test piece was measured before the test by means of a digital thickness probe, the mass was determined and from this the density was calculated.

The boards produced in this way were tested in accordance with EN 319 (transverse tensile strength test), EN 317 (thickness swelling and also water absorption), JIS 1460 (desiccator measurement, formaldehyde emission test) and DIN EN ISO 12460-5 (perforator method; formaldehyde emission test).

Transverse Tensile Strength

The transverse tensile strength was determined according to EN 319. To this end, each test specimen was bonded by means of a hot melt adhesive with two aluminium yokes on the top and bottom and then after cooling pulled apart on the testing machine (Zwick Zmart.Pro) at a constant test speed of 1 mm/min. The force leading to the break in the middle of the specimen was recorded and the resulting transverse tensile strength over the specimen area was calculated [N/mm$^2$].

Desiccator Measurement

The determination of the emission of formaldehyde was carried out by means of the desiccator measurement according to JIS 1460. The samples are placed in a sample container in a desiccator, in each of which there is a dish containing 300 ml of deionised water. In addition, two blank values, i.e. desiccator and water without sample, are measured.

The samples have a dwell time of 24 hours in the desiccators. Then 10 ml of water are taken from each water dish and 10 ml each of acetylacetone solution (4 ml/l) and ammonium acetate solution (200 g/l) are added. This mixture is heated to 40° C. for 15 minutes and cooled to room temperature for a further 1 hour whilst being stored in a dark environment.

The absorbance is measured on the photometer at a wavelength of 412 nm. This is then converted into mg/l according to a stored calibration.

Perforator Method

The determination of the emission of formaldehyde was carried out by means of the perforator method according to DIN EN ISO 12460-5. This is an extraction method with toluene as solvent (about 600 ml). The sample volume was around 100-150 g for the perforator measurement and around 100 g for the determination of the board moisture content (the result refers to a board moisture content of 6.5% and was calculated using a stored formula).

Thickness Swelling

The determination of the thickness swelling after 24 hours of storage in water was carried out according to DIN EN 317. For this, the test specimens were stored under water at a water temperature of 20° C. for 24 hours. Then, the increase in thickness was determined relative to the starting thickness and the percentage thickness swelling was calculated.

Water Absorption

The water absorption was determined on the thickness swelling samples, thus similarly after 24 hours of storage in water. For the calculation, the weight was measured after said 24 hours and the water absorption was then calculated according to the following formula:

$$\text{Water Absorption } (\%) = \frac{Mass_{afterwards} - Mass_{before}}{Mass_{before}} \times 100$$

The test results for reference boards without material for reducing the emission of formaldehyde, boards of the prior art with material for reducing the emission of formaldehyde, and boards according to the invention containing the porous carrier system according to the invention are shown below in Table 1.

The measurements were taken from 10 samples per board. Since two boards were produced for each type of board, the experimental results for determination of the emission of formaldehyde, transverse tensile strength, swelling and water absorption according to the methods described above in Table 1 are mean values of 20 test pieces.

TABLE 1

| Description | MV Transverse tensile strenght N/mm² | MV Desiccator mg/l | MV Perforator 6.5% mg/100 g | MV Swelling % | MV Water absorption % |
|---|---|---|---|---|---|
| Reference | 0.63 | 1.49 | 7.24 | 25.81 | 80.29 |
| 0.5 Wt.-% U | 0.54 | 1.00 | 5.13 | 34.71 | 95.81 |
| 2 Wt.-% U | 0.17 | 0.46 | 2.82 | 55.22 | 125.87 |
| 0.5 Wt.-% KGU | 0.62 | 1.32 | 6.35 | 31.54 | 87.27 |
| 0.4Wt.-% KGU + 0.1 Wt.-% KGS | 0.64 | 1.31 | 6.20 | 28.09 | 86.61 |
| 1.5 Wt.-%% KGU | 0.52 | 0.82 | 4.99 | 30.05 | 92.44 |
| 1.5 Wt.-% KGS | 0.61 | 1.45 | 7.31 | 26.85 | 87.83 |
| 3 Wt.-% KGU | 0.42 | 0.53 | 3.27 | 40.98 | 99.44 |
| 3 Wt.-% KGS | 0.54 | 1.33 | 7.51 | 24.08 | 85.88 |
| 2.7 Wt.-% KGU + 0.3 Wt.-% KGS | 0.44 | 0.39 | 2.83 | 38.01 | 97.70 |
| 3 Wt.-% KGUS | 0.51 | 0.69 | 4.45 | 27.55 | 91.32 |

MV: Average of 20 test pieces, U = urea, S = sodium sulphite, KG = diatomaceous earth Surprisingly, it was found that the addition of the diatomaceous earth loaded with urea and/or sodium sulphite significantly reduced the decline in transverse tensile strength of the wood-based materials—by adding the same quantity in wt.-% of one of the pure substances, such as urea (U), the transverse tensile strength drops by up to 80%.

It can also be seen from Table 1 that the addition of a mixture of urea-loaded diatomaceous earth (KGU) and sodium sulphite-loaded diatomaceous earth (KGS) compared to the addition of the same amount in wt.-% of urea-loaded diatomaceous earth (KGU) or diatomaceous earth (KGS) loaded only with sodium sulphite in the production of a wood-based material causes the emission of formaldehyde in the wood-based material, which comprises the mixture of KGU and KGS, in comparison to the emission of formaldehyde in the wood-based material which includes only KGU or KGS only, to be significantly reduced. The transverse tensile strength, swelling and water absorption of the wood-based material according to the invention, comprising a mixture of KGU and KGS, in comparison to the transverse tensile strength, swelling and water absorption of the wood-based material from the prior art, comprising the same amount in wt.-% of KGU only, were not impaired.

The addition of diatomaceous earth (KGUS) loaded with urea and sodium sulphite during the production of a wood-based material, compared to the addition of the same amount in wt.-% of urea-loaded diatomaceous earth (KGU), leads to a significantly increased transverse tensile strength, lower swelling and lower water absorption of the wood-based material according to the invention, comprising diatomaceous earth loaded with urea and sodium sulphite, and at the same time to an emission of formaldehyde comparable to that of the wood-based material of the prior art comprising urea-loaded diatomaceous earth (KGU).

The invention claimed is:

1. A porous carrier system for reducing the emission of formaldehyde in a wood-based material comprising:
   urea as a formaldehyde-binding substance; and
   sodium sulphite as a hydroxide-releasing substance,
   wherein urea and sodium sulphite are contained in at least one porous carrier material A, or urea is contained in at least one porous carrier material A and sodium sulphite is contained in at least one porous carrier material B, and
   wherein the at least one porous carrier material A is diatomaceous earth, and the at least one porous carrier material B is diatomaceous earth, wherein
   (a) the diatomaceous earth of the at least one porous carrier material A or the diatomaceous earth the at least one porous carrier material B has a pore distribution between 0.1 and 0.001 mm; or
   (b) the diatomaceous earth of the at least one porous carrier material A and the diatomaceous earth the at least one porous carrier material B have a pore distribution between 0.1 and 0.001 mm.

2. A method for producing a porous carrier system for reducing the emission of formaldehyde in the wood-based material of claim 1, wherein the formaldehyde-binding substance urea and the hydroxide-releasing substance sodium sulphite are both contained in at least one porous carrier material A, the method comprising the following steps:
   a1) applying a liquid composition comprising urea and sodium sulphite to a porous carrier material A, wherein the porous carrier material A is diatomaceous earth and has a pore distribution between 0.1 and 0.001 mm; and b1) at least partially removing the liquid composition from the porous carrier material A, or a2) applying a first liquid composition comprising urea to at least one porous carrier material A, wherein the at least one porous carrier material A is diatomaceous earth and has a pore distribution between 0.1 and 0.001 mm;

b2) at least partially removing the first liquid composition from the at least one porous carrier material A;

c2) applying a second liquid composition comprising sodium sulphite to the at least one porous carrier material A; and d2) at least partially removing the second liquid composition from the at least one porous carrier material A.

3. A method for producing a porous carrier system for reducing the emission of formaldehyde in the wood-based material of claim 1, wherein the formaldehyde-binding substance urea is contained in at least one porous carrier material A and the hydroxide releasing substance sodium sulphite is contained in at least one porous carrier material B, the method comprising the following steps:

a) applying a liquid composition comprising urea to the at least one porous carrier material A to form a wetted porous carrier material A, wherein the at least one porous carrier material A is diatomaceous earth and has a pore distribution between 0.1 and 0.001 mm;

b) applying a liquid composition comprising sodium sulphite to the at least one porous carrier material B to form a wetted porous carrier material B, wherein the at least one porous carrier material B is diatomaceous earth and has a pore distribution between 0.1 and 0.001 mm;

c) at least partially removing the liquid compositions from the wetted porous carrier material A and the wetted porous carrier material B to obtain loaded porous carrier materials A and B, and d) mixing the loaded porous carrier materials A and B.

4. The method of claim 3, wherein the applying of the liquid composition of step a) is selected from immersing the porous carrier material A in the liquid composition, flooding the porous carrier material A with the liquid composition, and spraying the liquid composition on the porous carrier material A; and the applying of the liquid composition of step b) is selected from immersing the porous carrier material B in the liquid composition, flooding the porous carrier material B with the liquid composition, and spraying the liquid composition on the porous carrier material B.

5. The method of claim 4, wherein the applying of the liquid composition of step a) further comprises applying a vacuum to the porous carrier material A, or the applying of the liquid composition of step b) further comprises applying a vacuum to the porous carrier material B.

6. The method of claim 3, wherein the applying of the liquid composition of step a) further comprises resting the porous carrier material A in the liquid composition; or the applying of the liquid composition of step b) further comprises resting the porous carrier material B in the liquid composition.

7. The method of claim 3, wherein the at least partially removing the liquid compositions of step c) comprises filtering the wetted porous carrier materials A and B to at least partially remove the liquid compositions.

8. The method of claim 3, further comprising drying the wetted porous carrier materials A and B after the at least partially removing the liquid compositions of step c).

9. A method of reducing the emission of formaldehyde in a wood-based material comprising applying the porous carrier system according to claim 1 to a wood-based material.

10. A wood-based material comprising a porous carrier system for reducing the emission of formaldehyde according to claim 1.

11. A method for producing a wood-based material, comprising the following steps:

a) providing a lignocellulose-containing material in the form of wood particles;

b) sizing the lignocellulose-containing material with a composition comprising at least one aminoplast resin; and c) pressing the lignocellulose-containing material into a wood-based material, wherein, the porous carrier system according to claim 1 is added to the lignocellulose-containing material prior to the pressing of step c).

* * * * *